United States Patent [19]

van Drimmelen et al.

[11] 4,394,265
[45] Jul. 19, 1983

[54] VESSEL IN PARTICULAR SUCTION DREDGER PROVIDED WITH MEANS FOR REMOVING OIL FROM A WATER SURFACE

[75] Inventors: Nicolaas J. van Drimmelen, Alblasserdam; James P. Barneveld Binkhuysen, Papendrecht; Johan van Renssen, Maassluis; Pieter Verboom, Alblasserdam, all of Netherlands

[73] Assignee: IHC Holland N.V., Papendrecht, Netherlands

[21] Appl. No.: 105,530

[22] Filed: Dec. 20, 1979

[51] Int. Cl.³ .............................................. E02B 15/04
[52] U.S. Cl. .................................. 210/242.3; 37/58; 37/72; 210/923
[58] Field of Search ............... 37/58, 72; 210/83, 242, 210/DIG. 25, DIG. 26, 242.3, 923

[56] References Cited

U.S. PATENT DOCUMENTS

| | | | |
|---|---|---|---|
| 3,512,281 | 5/1970 | Hadjidakn | 37/58 |
| 3,581,899 | 6/1971 | Hunter | 210/DIG. 26 |
| 3,651,943 | 3/1972 | Di Perna | 210/242 S |
| 3,739,503 | 6/1973 | Barker | 37/72 |
| 3,777,376 | 12/1973 | Turner et al. | 37/72 |
| 3,783,129 | 1/1974 | Bunn | 210/DIG. 26 |
| 3,884,807 | 5/1975 | Heddon | 210/242 S |
| 3,909,416 | 9/1975 | In't Veld | 210/242 S |
| 3,975,842 | 8/1976 | Andreae | 37/58 |
| 4,006,086 | 2/1977 | Tsunoi | 210/242 S |
| 4,102,064 | 7/1978 | Pot | 37/72 |

*Primary Examiner*—Frank A. Spear, Jr.
*Attorney, Agent, or Firm*—Young & Thompson

[57] ABSTRACT

A suction dredger provided with sweeping arms at the side of the vessel which arms can be placed at an angle with respect to the body of the vessel and are provided with suction apparatus to suck away the upper layer of the water collected in front of the sweeping arms to pump it into the hold of the vessel so that said hold optionally can be used for storing dredging material or oil respectively. The invention further relates to the construction of the apparatus for connecting the sweeping arms to the vessel and to move said arms from an inward storage position into an outboard operative position and vice versa, the sweeping arms being in a tilted position when inboard and if necessary displaceable in the longitudinal direction of the vessel along its deck so that in the case of a suction dredger the normal dredging apparatus can perform its function without being hampered by the sweeping arms, the construction of said apparatus being such that the sweeping arm can be applied to any other type of vessel.

18 Claims, 4 Drawing Figures

VESSEL IN PARTICULAR SUCTION DREDGER PROVIDED WITH MEANS FOR REMOVING OIL FROM A WATER SURFACE

The invention relates to a suction dredger, comprising a vessel with a hold for storing the dredged material, such as a mixture of sand and water and means for emptying said hold, a suction pipe with suction head, a suction pressure conduit debouching within the hold, said vessel further having its own power and control means as well as collecting means to be placed at the side of the vessel and intersecting the water surface and provided with means for sucking up oil floating upon the water surface and collected in front of the catching means, said vessel having tanks for storing the collected oil-water mixture.

A suction dredger of this type is known in the form of the Japanese suction dredger "SEIRYU MARU". Said vessel has been provided with separate storage tanks for the collected oil-water mixture, which tanks are provided within the body on both sides of the hold for the dredged material. This has serious objections. In the first place said tanks cannot be well emptied in case of oils or emulsions which are difficult to be handled by a pump. Furthermore gas mixtures can be formed within said tanks with the risk of an explosion as a result of electrostatic discharges. This requires the presence of an inert gas system.

The object of the invention is to provide a suction dredger which in many respects is more favourable.

According to the invention this object is achieved in the first place in that the hold of the dredger serves for the storage of the oil-water mixture. By making use of the hold and storing the mixture of oil and water within the space within which normally dredged material such as sand is stored, no additional provisions such as storage tanks are necessary. Within the hold automatically a separation between oil and water takes place. The water collected in the lower part of the hold can be pumped away through an oil separating cleaning apparatus.

One need not to be afraid that explosive gas mixtures are formed. The invention is based upon the recognition that layers of crude oil floating upon the sea surface already have lost their light evaporative fractions so that the risk of explosion within the open hold does not exist. Discharging the holds does not create a problem because the open hold is easily accessible.

An important advantage is provided by the fact that the construction of the suction dredger hardly has to be changed, except for the provision of the sweeping arms.

Suction dredgers usually are provided with a suction tube with suction head at one or both sides of the vessel which tube has to be designed such that it can be brought on board which means upon the deck in its entirety or be moved overboard and during operation be supported by hoists. The collecting means should be operative over an area as large as possible. However, conflicts with the suction tube must be excluded.

The invention now provides for a very effective constructive design in the first place in that each collecting means is formed by a sweeping arm which has been connected to a connection arm which at least about a horizontal axis is swingably connected to a carrier attached to the edge of the deck and extending from there rearwardly which connection arm at its rear end carries the sweeping arm by means of a universal joint. Due to the rearwardly extending connection arm it becomes possible to move the point of attachment far forwardly and still apply force along the sweeping arm. Due to the pivotal connections of the sweeping arm with the connection arm and of the connection arm with the carrier both arms can be folded against the body of the vessel or be released e.g. by means of cables and placed at an angle with respect to said body. If in addition one also makes use of a vertical pivotal axis at the location of the carrier attached to the edge of the deck which pivot eventually can be locked then it becomes possible to keep the inner end of the sweeping arm at a distance from the body of the vessel in case this becomes desirable.

Preferably the combination of sweeping arm and connection arm in its folded position is tiltable about an axis extending parallel to the edge of the deck said tiltability being between an operative position in which the entirety extends outboard and a storage position in which the entirety is tilted about said axis towards an inboard position. Accordingly the combination of sweeping arm and connection arm can be tilted inboard and thus optionally one can make use of the normal suctiontube apparatus of the suction dredger or of the oil collecting apparatus.

To tilt the two arms inboard many constructions are possible. This can be done with separate hoists or with davits respectively and inprinciple one can then keep the folded arms in a horizontal position upon the deck but also can place them in another position e.g. a vertical position.

Preferably the carrier of the connection arm and the sweeping arm is secured to a torsionally stiff structure, such as a tube, extending parallel to the axis which extends parallel to the edge of the deck, said structure being rigidly connected to at least two derricks spaced apart in the longitudinal direction of the vessel and swingable about said axis, said derricks having hoisting means such as winches connected to the sweeping arm.

The combination of connection arm and sweeping arm is difficult to handle. Due to the torsionally stiff connection a combination of connection arm and sweeping arm is obtained which in a stable condition and folded condition can be tilted inwardly or outwardly and then can be lowered by paying out the hoisting means. The hoisting means can be formed by cable winches placed upon the derricks. The torsionally stiff connection provides for a very stable unit.

In this way a sweeping apparatus can be obtained which by means of the winch cables can be drawn into the folded condition and be lifted so that the connection arm and the sweeping arm lie against each other and against the derricks. This in particular can be performed if according to the invention the derricks are provided with a rigid support lever which in the operative position extends downwardly and in the storage position extends principally horizontally and which forms an abutment or supporting surface for the sweeping arm. If in that case the movability of the derricks is limited by abutments defining the operative position and the storage position respectively a sweeping apparatus is obtained which also in heavy weather can be held in its storage position and used in its operative position.

Preferably a hydraulic cylinder is provided adjacent to the pivotal connection of the connection arm with the carrier, said cylinder extending between the connection arm and the torsionally stiff construction or the carrier connected to said construction, said cylinder defining the angle of displacement of the connection arm about its vertical pivot. This makes it possible to keep the sweeping arm at the desired correct distance from the hold or body of the vessel.

The sweeping arm has to follow the movements of the waves. The connection arm resists this by its weight so that according to the invention it is advantageous to provide a spring between the derrick and the connection arm preferably adjacent to the pivotal connection of the connection arm with the carrier, which spring takes up at least part of the waves motion of the connection arm. Said spring can have the form of a well known swell compensator.

According to the invention it further can be advantageous if the entire portion which can be tilted about the said horizontal longitudinal axis and which accordingly can be formed by the connection arm, the sweeping arm and the derricks together with the torsionally stiff connection inbetween, has been placed upon a device such as a carriage which can be moved in the longitudinal direction of the vessel. In that case it is possible to move the entirety of said parts towards the rear portion of the vessel when brought into the storage position thanks to which the area of the suction tube becomes entirely free.

The invention offers the further advantage that thanks to said connection arm, the oil conduit through which the mixture of oil and water is pumped as well as the hydraulic conduits of the hydraulic engines of the pumps are protected against unfavourable loads such as tension.

Oil sweeping arms for vessels are known in themselves and it is known as well to place the pumps which serve for sucking up the collected oil, within the arms. When the sweeping arms have long lengths it is known as well to provide them with floats at the outer ends which floats are interconnected by a frame provided with floating bevels such that, over the length of the sweeping arm, an adaptation to the wave pattern is possible. Said known sweeping arms during storage as well as when placed overboard and in their operative position are held under control only by means of cables of the usual independent hoisting means of the vessel.

The sweeping arm according to the invention has been connected to the vessel in a new and effective way such that the vessel optionally can be used for collecting oil or can perform its normal suction work without the one operation being affected by the provisions necessary for the other operation.

The invention can also be applied to any vessel to which a sweeping arm can be attached whilst the storage of the oil-water mixture takes place in a different way. In other words the unit formed by the sweeping arm, the connection arm the carrier and the derricks interconnected by the torsionally stiff structure can be placed on the deck of any vessel.

The invention now will be further elucidated with reference to the drawings.

Figure 1:
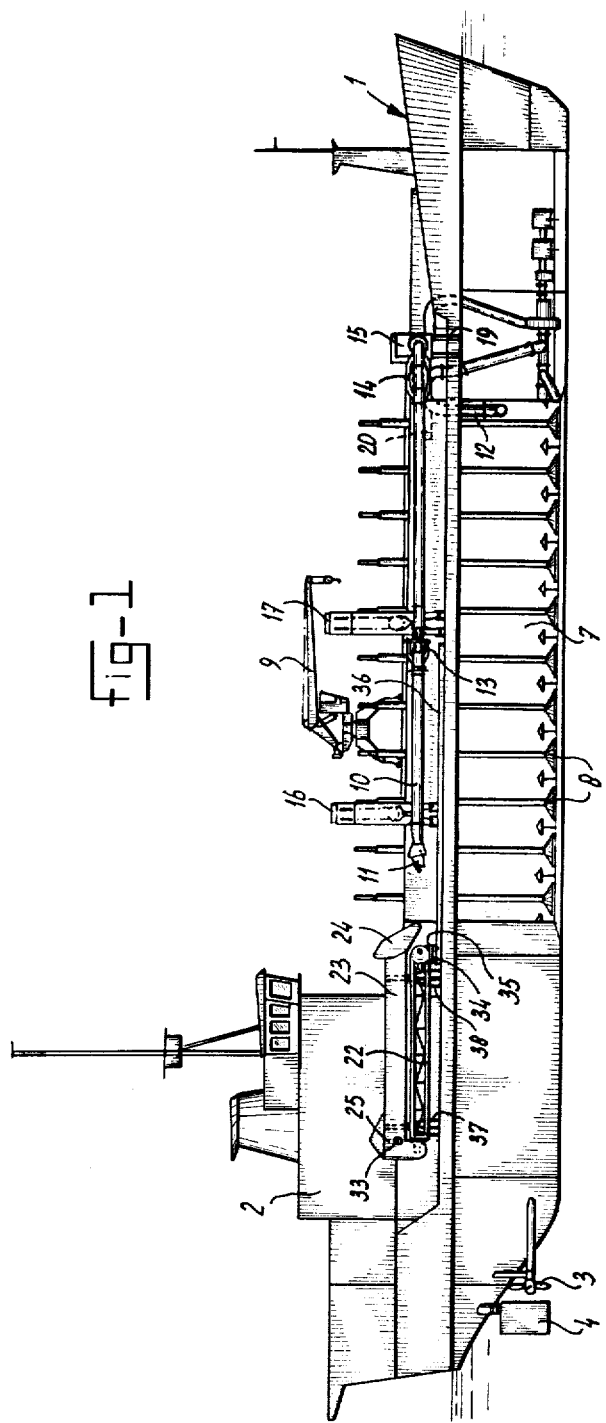
FIG. 1 shows a suction dredger in side view provided with an oil sweeping apparatus shown in its storage position.
Figure 2:
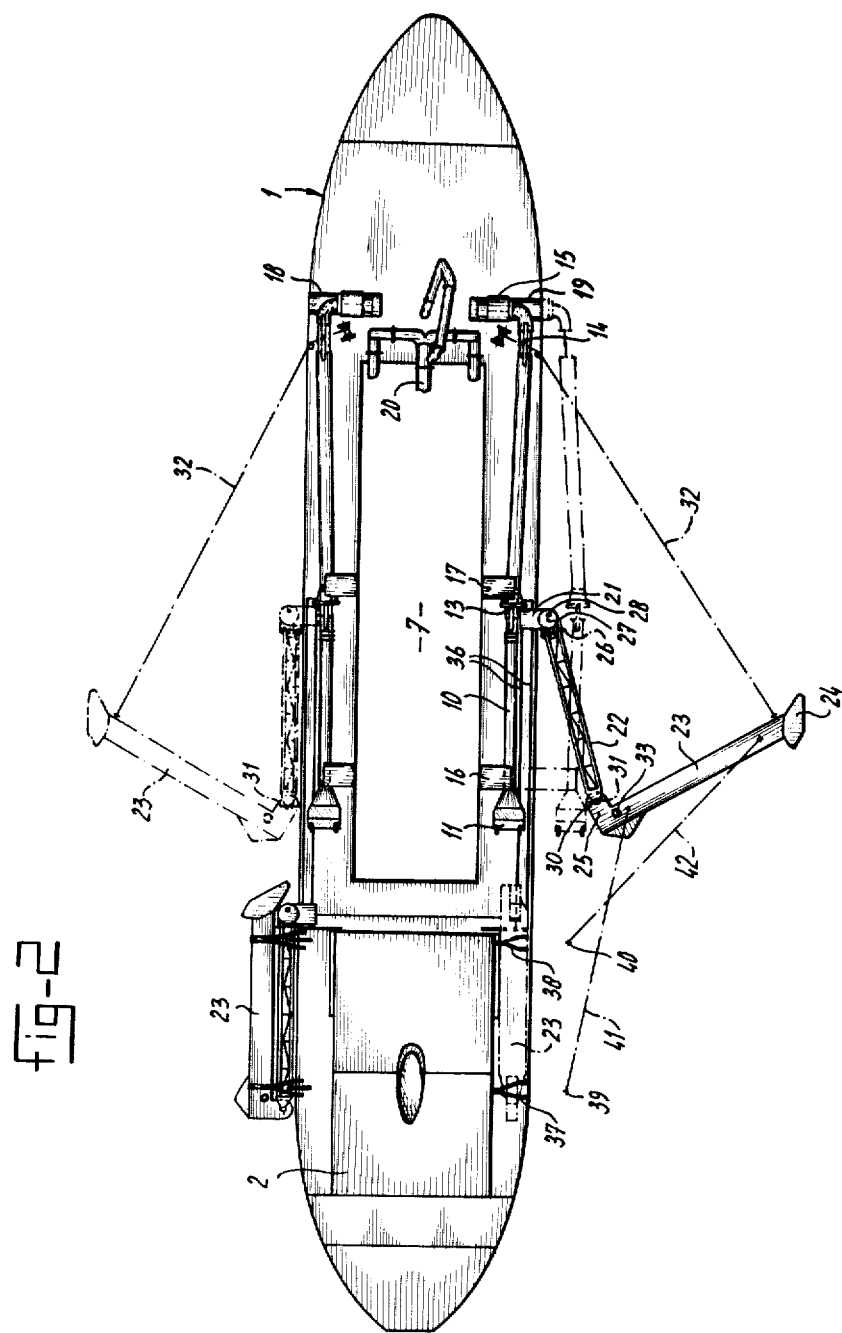
FIG. 2 is a top view of the suction dredge of FIG. 1 and discloses different positions of the oil sweeping apparatus.

The suction dredger shown in FIGS. 1 and 2 comprises a hull 1 with the usual super structure 2, propelller 3 and rudder 4.

The hold is indicated at 7 having in its bottom the valves 8 shown in FIG. 1.

On deck is a movable crane 9 and the deck further carries the suction tube 10 with suction mouth 11. Said suction tube at two places has been provided with a pivot 13 and 14 respectively and at its end opposite the suction head a connecting device 15. At 16 and 17 hoisting means are indicated by means of which the suction tube can be lifted and moved overboard and canbe lowered. During movement overboard the connecting device 15 is also moved outwardly over the guide tracks 18 and 19 so that in a known way a connection is formed with the suction conduit 12 and thanks to this with the pressure conduit 20 which serves for filling the hold. This connection is not shown but is generally known in itself.

FIG. 2 shows at one side with interrupted lines the position of the suction tube outboard the vessel. FIGS. 1 and 2 further disclose how this vessel can be provided with an oil sweeping apparatus. Said apparatus comprises a carrier 21 having a connection arm 22 and a sweeping arm 23. The sweeping arm can be provided with floats 24 and 25 at its opposite ends.

The connection arm 22 has a connection with the carrier 21 through a horizontal pivot axis 26 extending transversely to the vessel.

Figure 3:
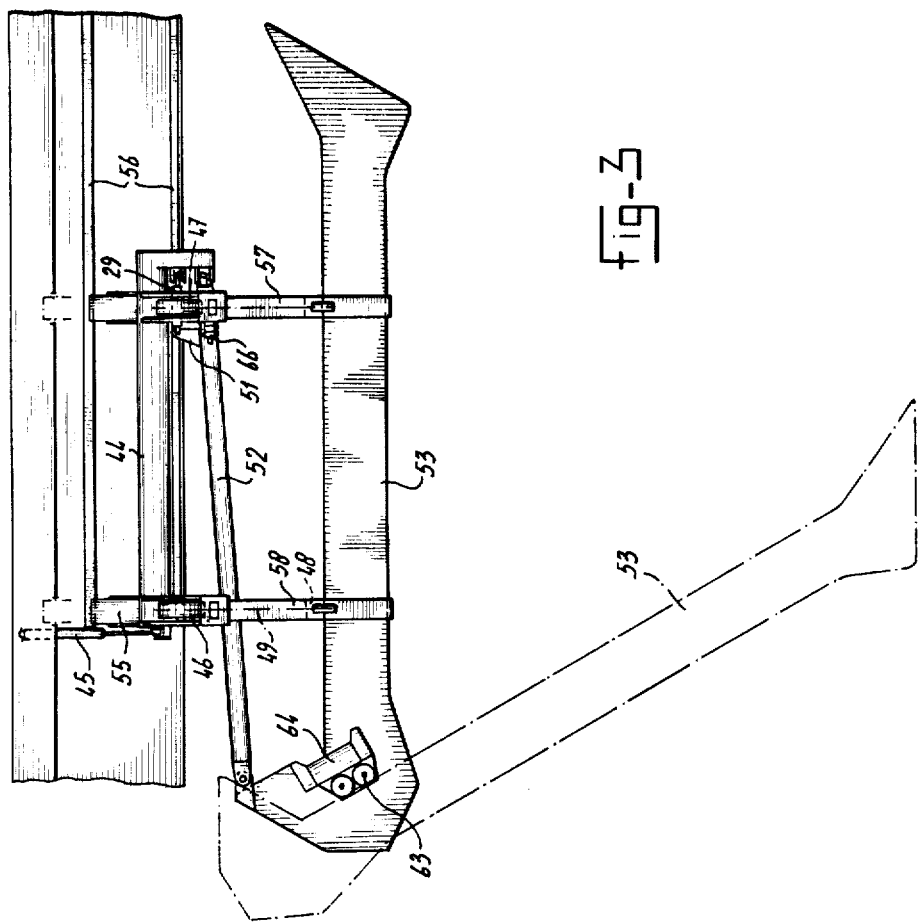
FIG. 3 shows diagrammetically another embodiment of the oil sweeping apparatus seen from above and FIG. 4 shows the embodiment of FIG. 3 partly in cross section partly in end view of the vessel.

The carrier itself can have a vertical pivot axis 27 with the connection arm. Normally this will be desirable but it can be desirable as well to lock the angular displacements of the axis 27. This can be performed in a simple way by means of the pin 28 shown in the lower part of FIG. 2 or by means of a hydraulic cylinder 29 (FIG. 3).

The lower end of the connection arm 22 which in the drawing forms the left end thereof has a pivotal connection with the sweeping arm 23 formed by a vertical pivot axis 30 and a horizontal pivot axis 31 extending transverse to the vessel. Preferably a third pivot axis is provided so that the connection is formed by a universal joint. Due to the plurality of pivot axes 26 to 31 inclusive, the sweeping mechanism can float next to the hull at any possible distance from the vessel, the connection arm then also extending obliquely downwardly and rearwardly from the carrier. The sweeping arm is held in its operative position by means of cables such as 32.

The oil collected in front of the sweeping arm is removed adjacent to the inner end of said arm by means of pumps 33 which discharge the oil-water mixture through a conduit which runs along the connection arm 22 and is directed into the hold 7.

In FIGS. 1 and 2 the storage position of the sweeping mechanism is shown at the left side of the drawing. To this end the carrier is swingable about an axle 34 which extends in the longitudinal direction of the vessel and is attached to a carriage 35 which can be moved over rails 36. In the operative position the carrier with connection arm and sweeping arm is located substantially in the central portion of the vessel whilst in the storage position it is located at the rear end so that the operation of the normal dredging mechanism is not disturbed.

FIG. 1 shows the sweeping mechanism also in its storage position in which it has been folded on deck. In this position the sweeping arm and the connection arm are drawn against each other and are suspended from hoisting means 37, 38 which can be swung inwardly or outwardly respectively. FIG. 1 shows the sweeping mechanism in its onboard folded position with the sweeping arm 23 on top of the connection arm 22. The same position is shown at the lower left side of FIG. 2 whilst at the top left in FIG. 2 the position is shown which takes place when the sweeping mechanism is tilted overboard with the connection arm 22 and sweeping arm 23 still in the horizontal position.

When the arms by means of the hoists 37 and 38 are lowered in the operative positions shown more to the right in FIG. 2 then the hoisting means will allow the sweeping arm 23 to move downwardly in a horizontal position until the water level is reached and the arms start to float; this happens from the points 39 and 40.

If thereafter the carriage 35 is moved forwardly over the rails 36 the hoisting cables upon the simultaneous outward movement of the sweeping arms will occupy positions as shown in FIG. 2 with the lines 41, 42.

Figure 4:
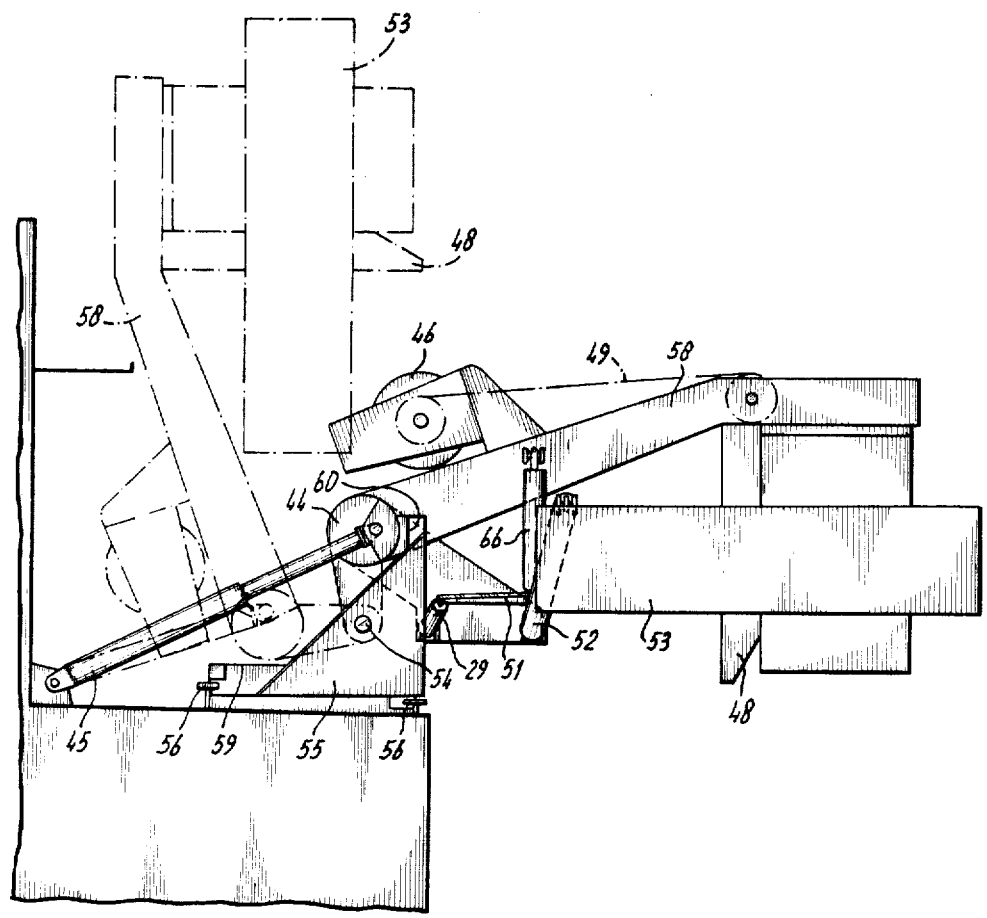

In FIGS. 3 and 4 another embodiment is shown. In FIG. 3 the sweeping arm 53 is shown in its folded position lying as close as possible against the connection arm 52 whilst the operative position is shown with interrupted lines.

The carrier 51 has been connected to a torsionally stiff tube 44 which interconnects the two derricks 57 and 58. Said derricks can swing about the horizontal axle 54 which is supported by the carriage 55 which carriage can be moved along the rails 56.

By means of the hydraulic cylinder 45 connected to the hoisting means at the level of the tube 44, the derricks from the horizontal position shown in FIG. 1 can be brought into the inwardly tilted storage position shown in FIG. 4 with interrupted lines.

Each derrick carries a winch 46 and 47 respectively. Each derrick has an integral leg 48 forming an abutment or support for the sweeping arm 53 when the latter is drawn against it by means of the hoisting cables 49.

The carriage 55 has abutment faces 59 and 60 defining the storage position and working position of the mechanism respectively.

The oil pumps in this embodiment are indicated at 63 and they receive the oil via an overflow 64.

If the carriage 55 is moved forwardly towards its operative position over the rails 56 the hydraulic cylinder 45 has to be disconnected unless said cylinder is supported on the carriage as well.

FIG. 3 further shows between the connection arm 52 and the tube 44 a hydraulic cylinder 29 which can define the angular position of the connection arm 52.

FIG. 4 discloses further a pneumatic cylinder or spring 66 between the derrick 58 and the connection arm 52 which spring takes part of the weight of the connection arm 52.

It is further to be observed that by means of the cylinder 45 one not only can move the sweeping mechanism on board or overboard but that it also is possible by placing the derricks in intermediate positions to define the position of the connection arm which swings about a horizontal transverse axis and so defines the position of the outer end of the connection arm and thus the position of the sweeping arm with respect to the vessel.

We claim:

1. In a suction dredger comprising a vessel having a hold for the storage of dredged material, means for emptying said hold, a suction conduit with a suction head, a suction-pressure pump in the suction conduit having a pressure conduit debouching within the hold, said vessel having its own power and control means, collecting means positionable at the side of the vessel and adapted to intersect the water surface and having means for sucking up oil floating upon the water surface and collected by the collecting means, said vessel having tanks for the storage of the sucked up oil-water mixture; the improvement in which said tanks are comprised by the open hold of the vessel normally serving for the storage of dredged material and the means for sucking up oil have said pressure conduit debouching into said hold, each said collecting means comprising a sweeping arm connected to a connection arm which is connected swingably about at least a horizontal axis to a carrier attached to the edge of the deck, said connection arm extending rearwardly from said carrier and having its rear end carrying the sweeping arm via a universal joint.

2. Suction dredger according to claim 1, characterized in that the combination of connection arm and sweeping arm in folded condition is swingable about an axis extending parallel to the edge of the deck between an operative position with the combination outboard and a storage position in which the entire combination has been tilted onboard about the said axis.

3. Suction dredger according to claim 2, characterized in that the parts which in combination can tilt about the said horizontal axis are placed upon a device which can be moved in the longitudinal direction of the vessel.

4. Suction dredger according to claim 2, characterized in that the carrier of connection arm and sweeping arm is connected to a torsionally stiff structure such as a tube which extends parallel to the said axis extending parallel to the edge of the deck, said structure being rigidly connected to at least two derricks placed at a distance from each other seen in the longitudinal direction from the vessel, which derricks can swing about the said axis and are provided with hoisting means which are connected with the sweeping arm.

5. Suction dredger according to claim 4, characterized in that the torsionally stiff tube is concentric with the said tilting axle.

6. Suction dredger according to claim 4, characterized in that the tiltable combination comprising connection arms, sweeping arm and derricks is swingable between abutments defining the operative position and the storage position.

7. Suction dredger according to claim 4, characterized in that the derricks are provided with an integral support arm which in the operative position is directed downwardly and in the storage position principally horizontally and which forms an abutment or supporting surface respectively for the sweeping arm.

8. Suction dredger according to claim 1, characterized in that a hydraulic cylinder is provided adjacent to the pivotal connection of the connection arm with the carrier between the connection arm and the torsionally stiff structure or the carrier respectively, which cylinder defines the annular displacement of the connection arm about the vertical pivot axis.

9. Suction dredger according to claim 1, characterized in that a spring is provided adjacent to the pivotal connection of connection arm and carrier between a derrick and the connection arm which spring takes part of the weight of the connection arm.

10. Vessel having means for collecting oil floating upon the water surface, said means comprising at least one sweeping arm connected to a connection arm which is swingably connected about at least a horizontal axis to a carrier attached to the edge of the deck and from there extends rearwardly carrying at its rear end the sweeping arm via a universal joint.

11. Vessel according to claim 10, characterized in that the combination of connection arm and sweeping arm in folded condition is swingable about an axis extending parallel to the edge of the deck between an operative position with the combination outboard and a storage position in which the entire combination is tilted onboard about the said axis.

12. Vessel according to claim 11, characterized in that the parts which in combination can tilt about the said horizontal axis are mounted on a device which can be moved in the longitudinal direction of the vessel.

13. Vessel according to claim 11, characterized in that the carrier of connection arm and sweeping arm is connected to a torsionally stiff structure such as a tube which extends parallel to the said axis extending parallel to the edge of the deck, said structure being rigidly connected to at least two derricks placed at a distance from each other seen in the longitudinal direction from the vessel, which derricks can swing about the said axis and are provided with hoisting means which are connected with the sweeping arm.

14. Vessel according to claim 13, characterized in that the torsionally stiff structure is a tube concentric with the said tilting axis.

15. Vessel according to claim 13, characterized in that the tiltable combination comprising connection arms, sweeping arm and derricks is swingable between abutments defining the operative position and the storage position.

16. Vessel according to claim 13, characterized in that the derricks are provided with an integral support arm which in the operative position is directed downwardly and in the storage position principally horizontally and which forms an abutment or supporting surface respectively for the sweeping arm.

17. Vessel according to claim 10, characterized in that a hydraulic cylinder is provided adjacent to the pivotal connection of the connection arm with the carrier between the connection arm and the torsionally stiff structure or the carrier respectively, which cylinder defines the annular displacement of the connection arm about the vertical pivot axis.

18. Vessel according to claim 10, characterized in that a spring is provided adjacent to the pivotal connection of connection arm and carrier between a derrick and the connection arm which spring takes part of the weight of the connection arm.

* * * * *